(12) United States Patent (10) Patent No.: US 8,764,046 B2
Baldemor et al. (45) Date of Patent: Jul. 1, 2014

(54) MULTI-FUNCTIONAL UTILITY CARTS

(76) Inventors: Jonathan Baldemor, Yorba Linda, CA (US); Le Bui, Tustin, CA (US); Peter Espartero, Stanton, CA (US)

( * ) Notice: Subject to any disclaimer, the term of this patent is extended or adjusted under 35 U.S.C. 154(b) by 1 day.

(21) Appl. No.: 13/555,128

(22) Filed: Jul. 21, 2012

(65) Prior Publication Data

US 2012/0286498 A1 Nov. 15, 2012

Related U.S. Application Data

(63) Continuation-in-part of application No. PCT/US2010/032323, filed on Apr. 24, 2010.

(60) Provisional application No. 61/296,926, filed on Jan. 21, 2010.

(51) Int. Cl.
*B62B 3/02* (2006.01)

(52) U.S. Cl.
USPC ........................................ 280/651; 280/47.29

(58) Field of Classification Search
USPC .......... 280/638, 35, 639, 640, 651, 652, 659, 280/47.24, 47.27, 47.29
See application file for complete search history.

(56) References Cited

U.S. PATENT DOCUMENTS

| | | | | |
|---|---|---|---|---|
| 2,598,168 A | * | 5/1952 | Hooz et al. | 280/641 |
| 5,476,282 A | * | 12/1995 | Dahl | 280/651 |
| 6,273,438 B1 | * | 8/2001 | Prapavat | 280/47.21 |
| 8,100,430 B2 | * | 1/2012 | Meyers et al. | 280/651 |

* cited by examiner

*Primary Examiner* — John Walters

(57) ABSTRACT

A utility cart that is capable of being converted into a collapsed position, a flat cart position, a dolly position, and a tilted position. The utility cart generally includes an interconnected frame that includes three sections, namely, a first section connected to a second section by a first joint, with the second section further being connected to a third section by a second joint. The utility cart also includes a fourth section (a base), which has a set of wheels affixed thereto. The utility cart further includes a support arm mechanism that attaches to the second section at a first end and to a bottom portion (of the base) of the utility cart at a second end. The second end of the support arm mechanism may be reversibly securable to a plurality of different points along the bottom portion of the utility cart.

18 Claims, 16 Drawing Sheets

MULTI-FUNCTIONAL UTILITY CARTS

CROSS-REFERENCE TO RELATED APPLICATIONS

This application is a continuation-in-part of and claims priority to PCT Patent Application Number PCT/US2010/032323, filed Apr. 24, 2010, which claims priority to U.S. provisional patent application Ser. No. 61/296,926, filed on Jan. 21, 2010.

FIELD OF THE INVENTION

The field of the present invention generally relates to utility carts that may converted into various positions, with each position being adapted for a different function.

BACKGROUND OF THE INVENTION

Many utility carts exist today which may be contorted into various positions—with each position being particularly adapted for a specific type of use (or to support a load in a particular manner). However, a majority of these utility carts may only be transformed into two or three primary positions. With respect to those utility carts that purportedly may be configurable into more than three positions, such utility carts often do not easily convert from a first position into a second position. Moreover, in many cases, the multi-functional utility carts that are available today are not structured to withstand a substantial load, while simultaneously being capable of collapsing into a compact and lightweight storage position. Still further, the currently-available utility carts are often unstable during use.

As explained further below, the present invention addresses many of these shortcomings of the utility carts that are available in the marketplace today.

SUMMARY OF THE INVENTION

According to certain aspects of the present invention, a utility cart is provided that is capable of being converted into at least four primary positions, namely, (1) a collapsed position (which is adapted to be compact for storage purposes); (2) a flat cart position (which provides a flat bed section for carrying cargo, bordered by one or two erect side portions); (3) a two-wheeled dolly position, and (4) a four-wheeled, adjustable tilted position. According to certain aspects of the invention, the utility cart generally comprises an interconnected frame that includes three sections—a first section connected to a second (middle) section by a first joint, with the second (middle) section being connected to a third section by a second joint. In addition, the utility cart comprises a fourth section, a base portion, which has a set of wheels affixed thereto.

The utility cart further comprises a support arm mechanism, which attaches to (1) the handle portion (third section) or second section of the utility cart at a first end of the support arm mechanism and (2) a bottom (base) portion of the utility cart at a second end of the support arm mechanism. The support arm is designed to assist the utility cart in supporting a load, when the utility cart is configured in the tilted position. The second end of the support arm mechanism may be reversibly securable to a plurality of different points along the bottom (base) portion of the utility cart, such that the utility cart may be easily converted into any of the four primary positions described herein (and to allow the angle of the load carrying surface of the utility cart, when in the tilted position, to be adjusted as needed by a user). In addition, according to certain embodiments of the present invention, the first and second joints referenced above are designed to allow the various sections of the utility cart to rotate and lock into various functional positions, such as in 90-degree increments.

According to additional aspects of the present invention, methods of using the utility cart described herein to transport cargo are provided.

The above-mentioned and additional features of the present invention are further illustrated in the Detailed Description contained herein.

DETAILED DESCRIPTION OF THE INVENTION

The following will describe several preferred embodiments of the present invention in detail. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

Figure 2:
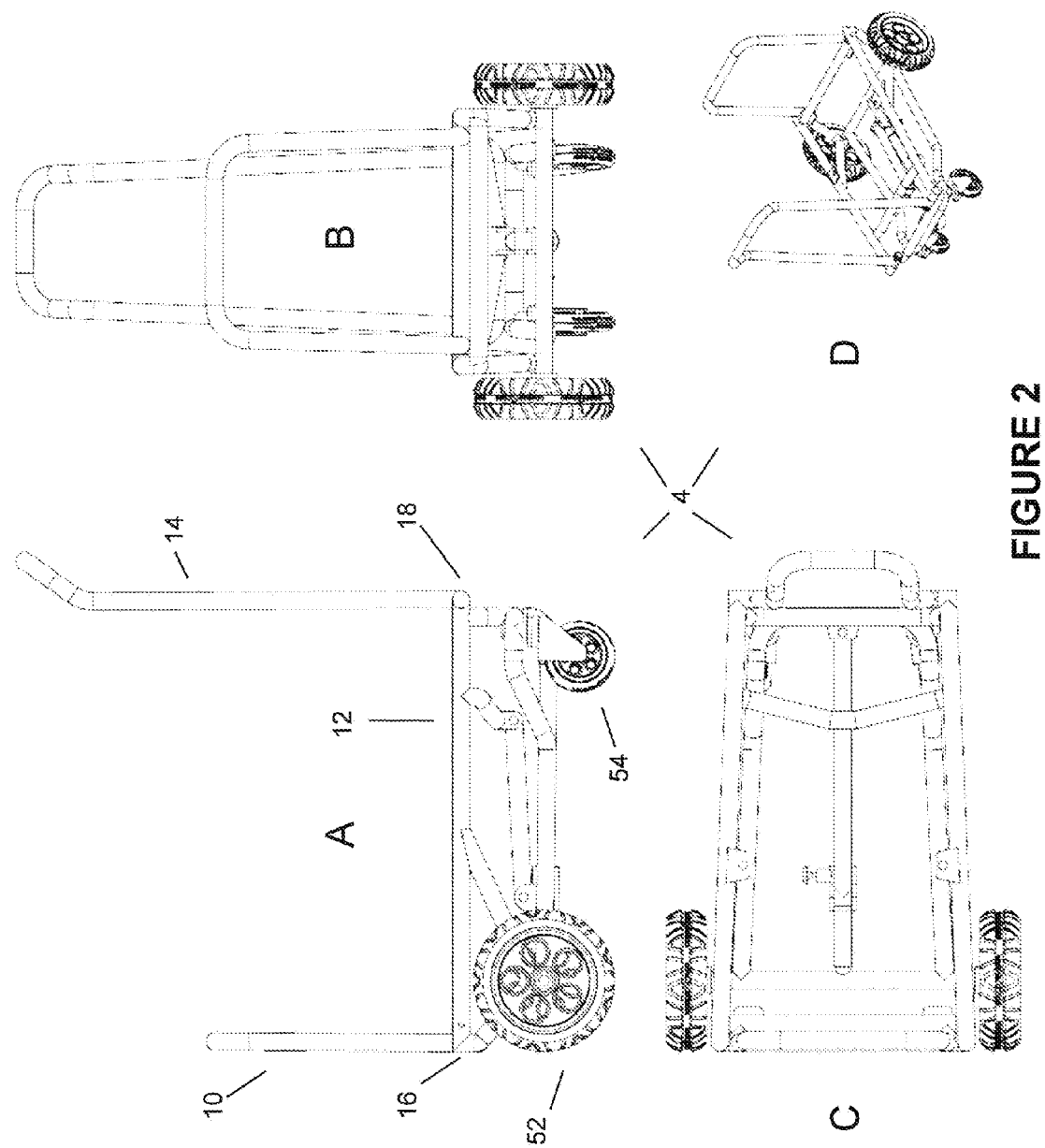
FIG. 2: (A) a side view of the utility cart described herein in a "flat cart" position; (B) a backside view of the utility cart described herein in a "flat cart" position; (C) a top view of the utility cart described herein in a "flat cart" position; and (D) a perspective view of the utility cart described herein in a "flat cart" position.
Figure 3:
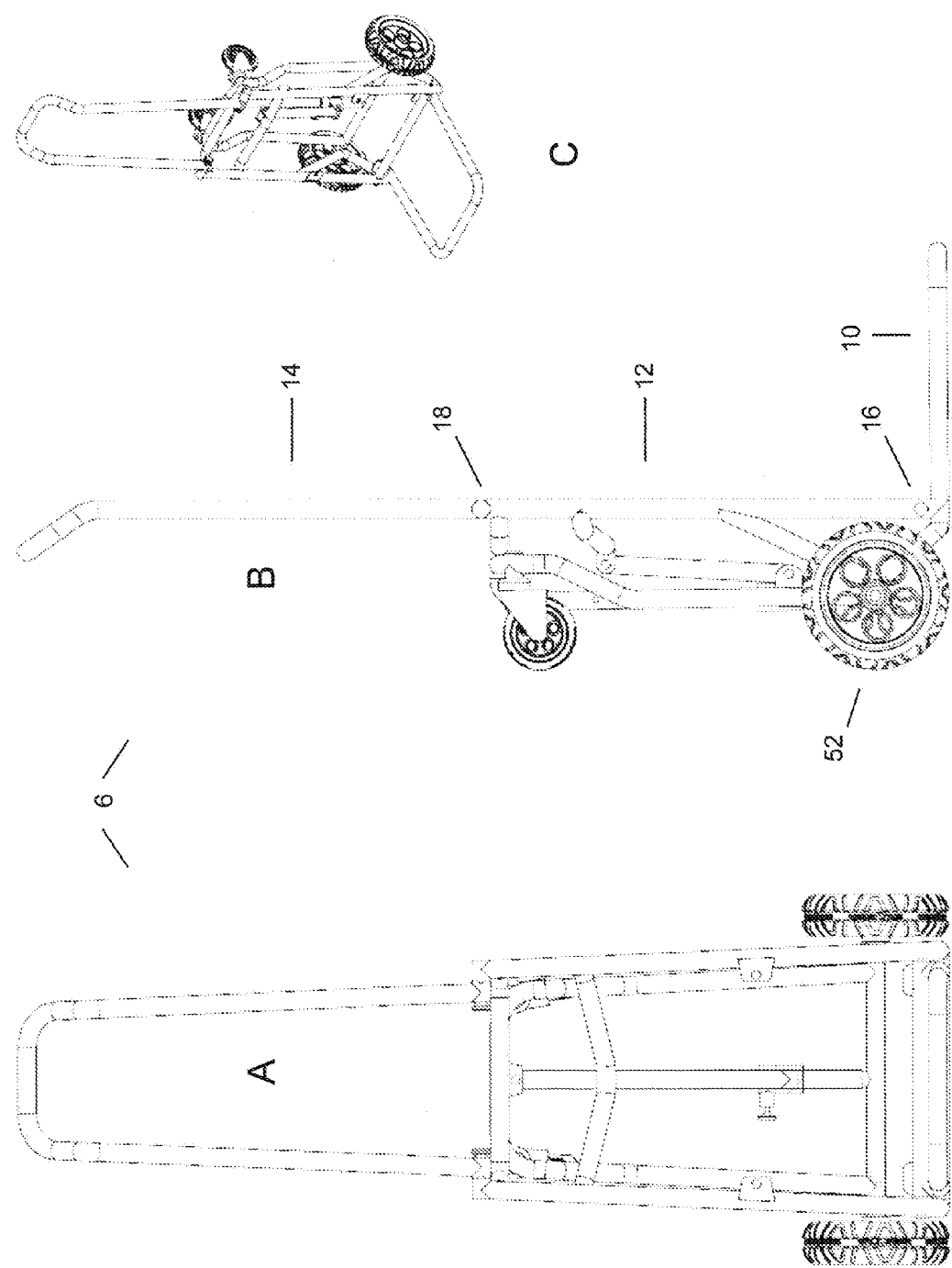
FIG. 3: (A) a front view of the utility cart described herein in a "dolly" position; (B) a side view of the utility cart described herein in a "dolly" position; and (C) a perspective view of the utility cart described herein in a "dolly" position.
Figure 4:
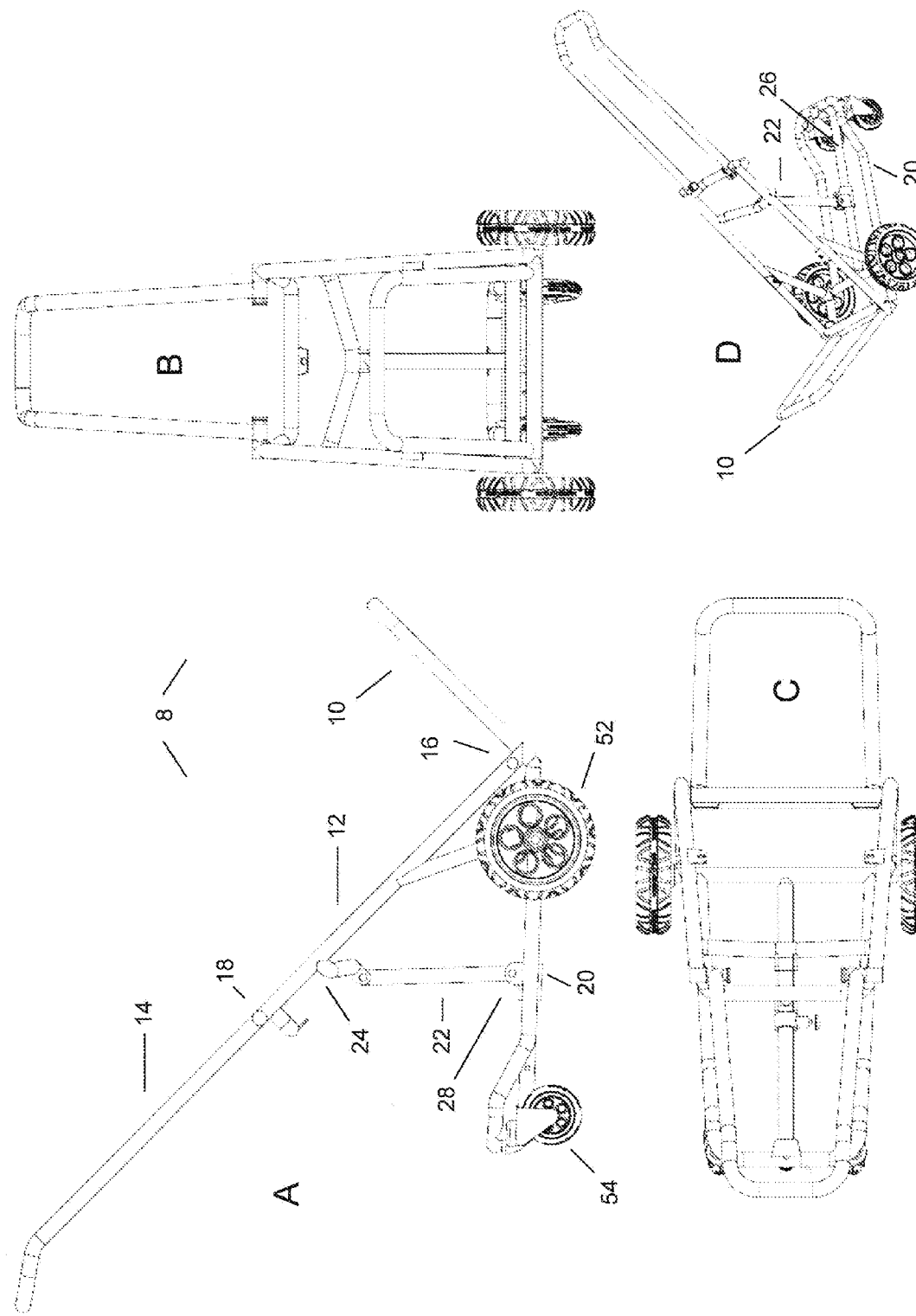
FIG. 4: (A) a side view of the utility cart described herein in a "tilted" position; (B) a backside view of the utility cart described herein in a "tilted" position; (C) a top view of the utility cart described herein in a "tilted" position; and (D) a perspective view of the utility cart described herein in a "tilted" position.

Referring now to FIGS. 1-4, the present invention encompasses a utility cart that is capable of being converted into four primary positions, namely, a collapsed position 2 (FIG. 1), a flat cart position 4 (FIG. 2), a dolly position 6 (FIG. 3), and a tilted position 8 (FIG. 4). The utility cart generally comprises an interconnected frame that comprises three sections, namely, a first section 10, a second section 12, and a third section 14. According to certain preferred embodiments of the present invention, the first section 10 is connected to a second section 12 by a first joint 16, and the second section 12 is connected to the third section 14 vis-à-vis a second joint 18. According to certain preferred embodiments, the invention provides that the first section 10 of the utility cart will exhibit a shorter length relative to the second section 12 and the third section 14. Still further, the invention provides that the third section 14 will preferably be equipped with a handle portion, which is adapted to be gripped by a user of the utility cart.

Figure 1:
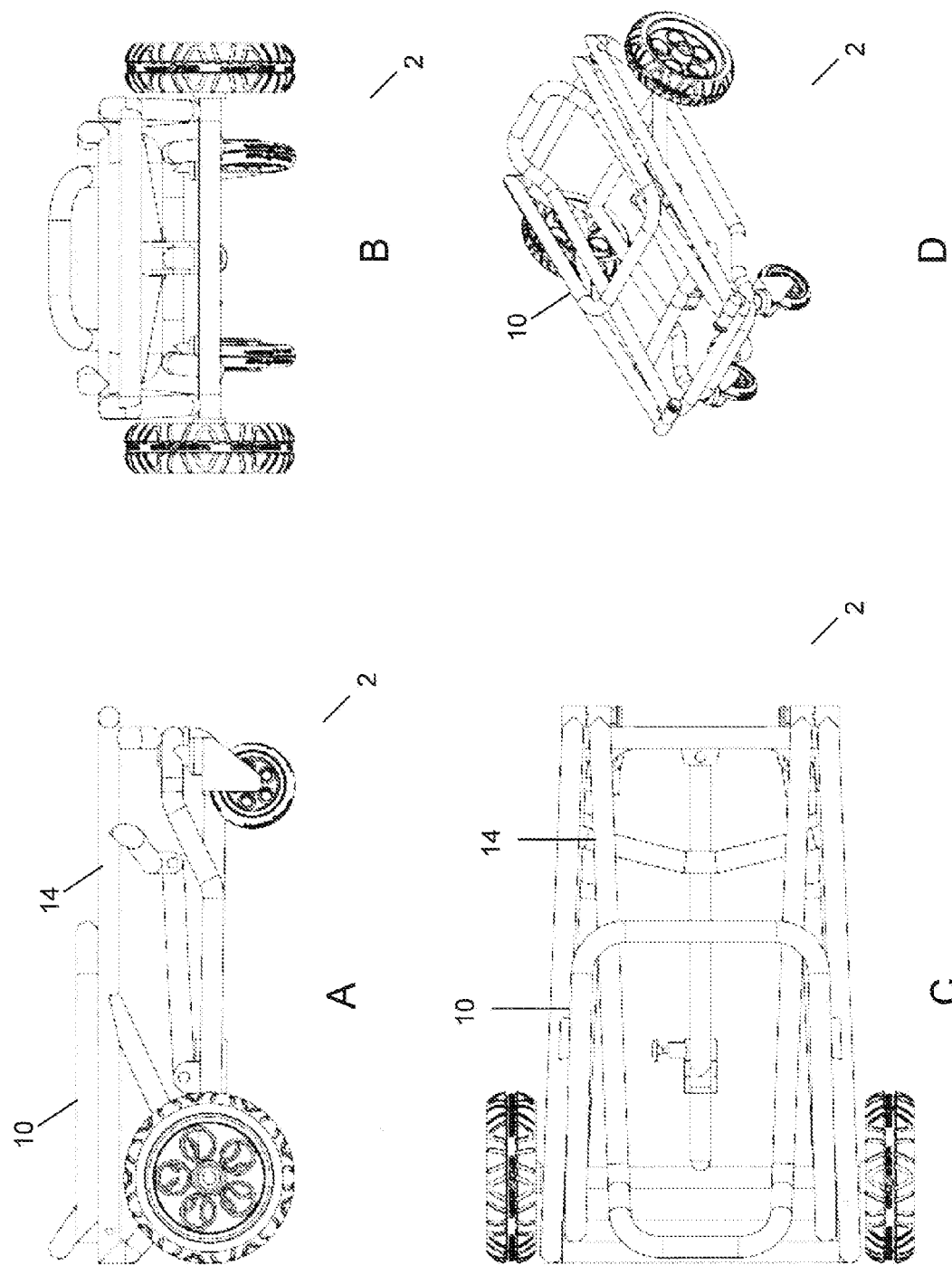
FIG. 1: (A) a side view of the utility cart described herein in a folded, collapsed position; (B) a backside view of the utility cart described herein in a folded, collapsed position; (C) a top view of the utility cart described herein in a folded, collapsed position; and (D) a perspective view of the utility cart described herein in a folded, collapsed position.

Referring to FIG. 1, the collapsed position 2 is intended to place the utility cart in a closed and compact configuration which is desirable for storage purposes. When the utility cart is placed in the collapsed position 2, the first, second, and third sections (10,12,14) are allowed to rotate about the first and second joints (16,18), such that the sections fold on top of each other (such that each of the sections are approximately parallel with and adjacent to each other). This configuration is advantageous for storage purposes, insofar as it places the utility cart in a compact position.

Referring now to FIG. 2, the flat cart position 4 preferably provides a user with a utility cart having (1) two sides (which are formed by the first section 10 and third section 14 of the utility cart), (2) a base portion that is formed by the second section 12, which is adapted to transport any desired cargo, and (3) three or four wheels positioned on the ground. The flat cart position 4 is advantageous in view of the two sides that are formed by the first section 10 and third section 14 of the utility cart, which will serve to retain any cargo that is placed on the load-bearing second section 12.

Referring to FIG. 3, the dolly position 6 will preferably configure the utility cart to have the third section 14 and second section 12 described herein positioned in an approximately parallel and contiguous fashion, with the first section 10 being positioned approximately perpendicular to the second section 12. In other words, the third section 14 and second section 12 will be positioned in line with each other. In the dolly position 6, the first section 10 is configured to hold and carry the desired cargo (along with the second section 12 when the utility cart is tilted and being used to transport cargo using a single pair of wheels 52, which are located proximate to the second joint 16.

Referring now to FIG. 4, the tilted position 8 is a four-wheel tilted cart position, with the third section 14 and second section 12 described herein positioned in an approximately parallel and contiguous fashion (similar to the dolly position 6), with the first section 10 being positioned approximately perpendicular to the second section 12 (also similar to the dolly position 6). In the tilted position 8, however, a base portion 20 of the utility cart has affixed thereto a set of wheels, which preferably comprise at least three wheels and, even more preferably, a set of at least four wheels (with two wheels positioned near the front 52 of the cart and two wheels positioned near the back 54 of the cart). In addition, the utility cart comprises a support arm mechanism 22 that attaches to (1) either the handle portion (third section 14) or the second section 12 at a first end 24 and (2) to a bottom portion 26 of the utility cart at a second end 28. The bottom portion 26 of the utility cart preferably comprises a bar that runs within the approximate center of the base portion 20, beginning at or near an axis for the first set of wheels and ending at or near the axis of the second set of wheels. The invention provides that the first end 24 and the second end 28 of the support arm mechanism 22 each comprise a hinge. According to such embodiments, the second end 28 of the support arm mechanism 22 is reversibly securable to a plurality of points 30 (FIG. 5) along the bottom portion 26. In addition to the embodiment shown and described herein, the support arm mechanism 22 may be configured as a fold-out arm, which may be reversibly extended and reversibly secured to a plurality of points 30 along the bottom portion 26 of the cart. That is, the invention encompasses support arm mechanisms 22 which may be reversibly secured to a plurality of points 30 along the bottom portion 26 of the cart, using suitable mechanical means other than those illustrated herein.

Figure 5:
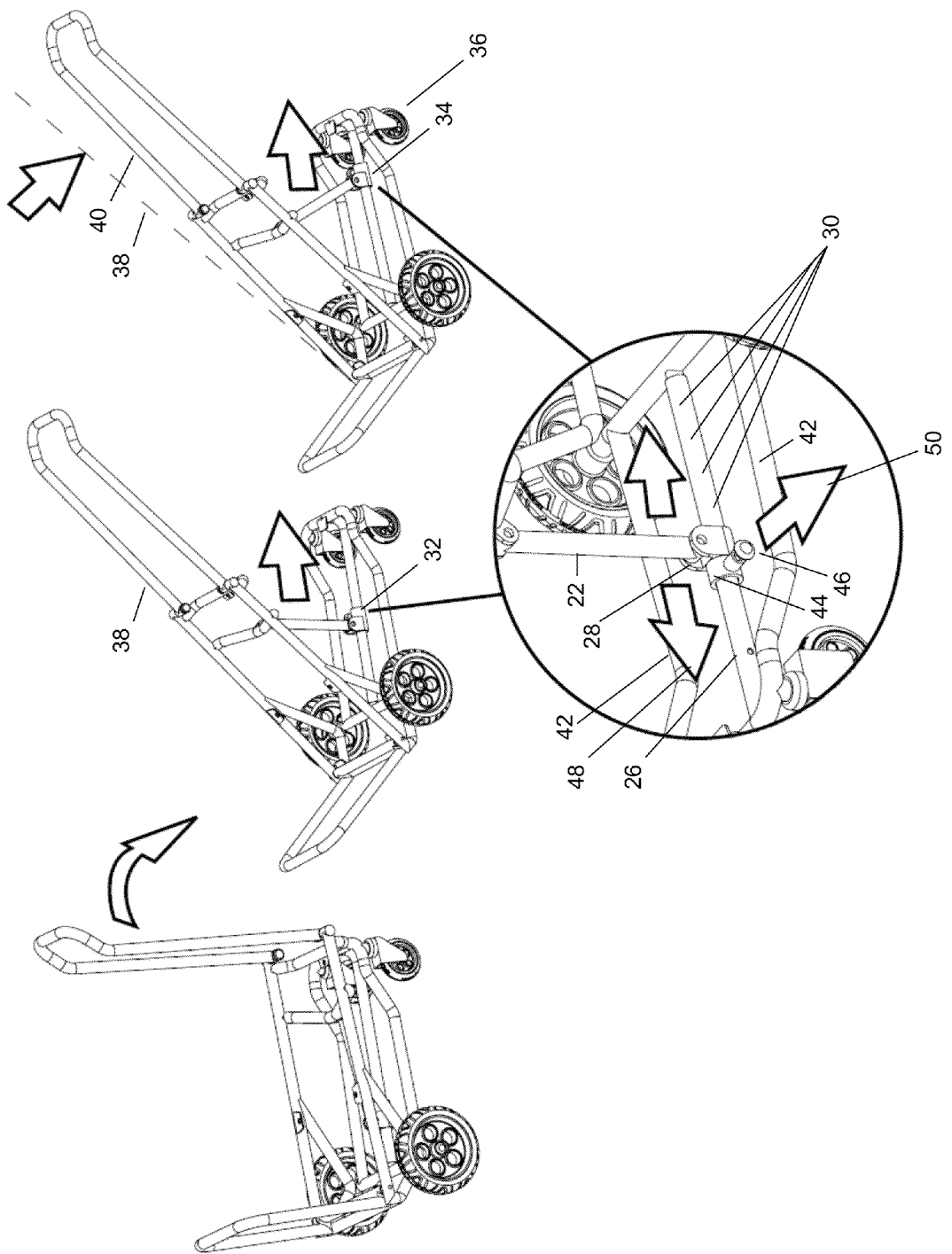
FIG. 5: a diagram illustrating the functionality of the support arm mechanism of the utility cart described herein.

Referring to FIGS. 4 and 5, according to certain preferred embodiments, the invention provides that securing the second end 28 of the support arm mechanism 22 along different areas 30 of the bottom portion 26 causes a load bearing surface or plane formed by the second section 12 and third section 14 to move forwards or backwards, when the utility cart is in a tilted position 8. For example, as shown in FIG. 5, when the second end 28 of the support arm mechanism 22 is moved from an approximate center area 32 of the bottom portion 26 to an area 34 that is proximate to a back wheel (or set of wheels) 36, the load bearing surface or plane formed by the second section 12 and third section 14 moves from a first position 38 to a second position 40.

Figure 6:
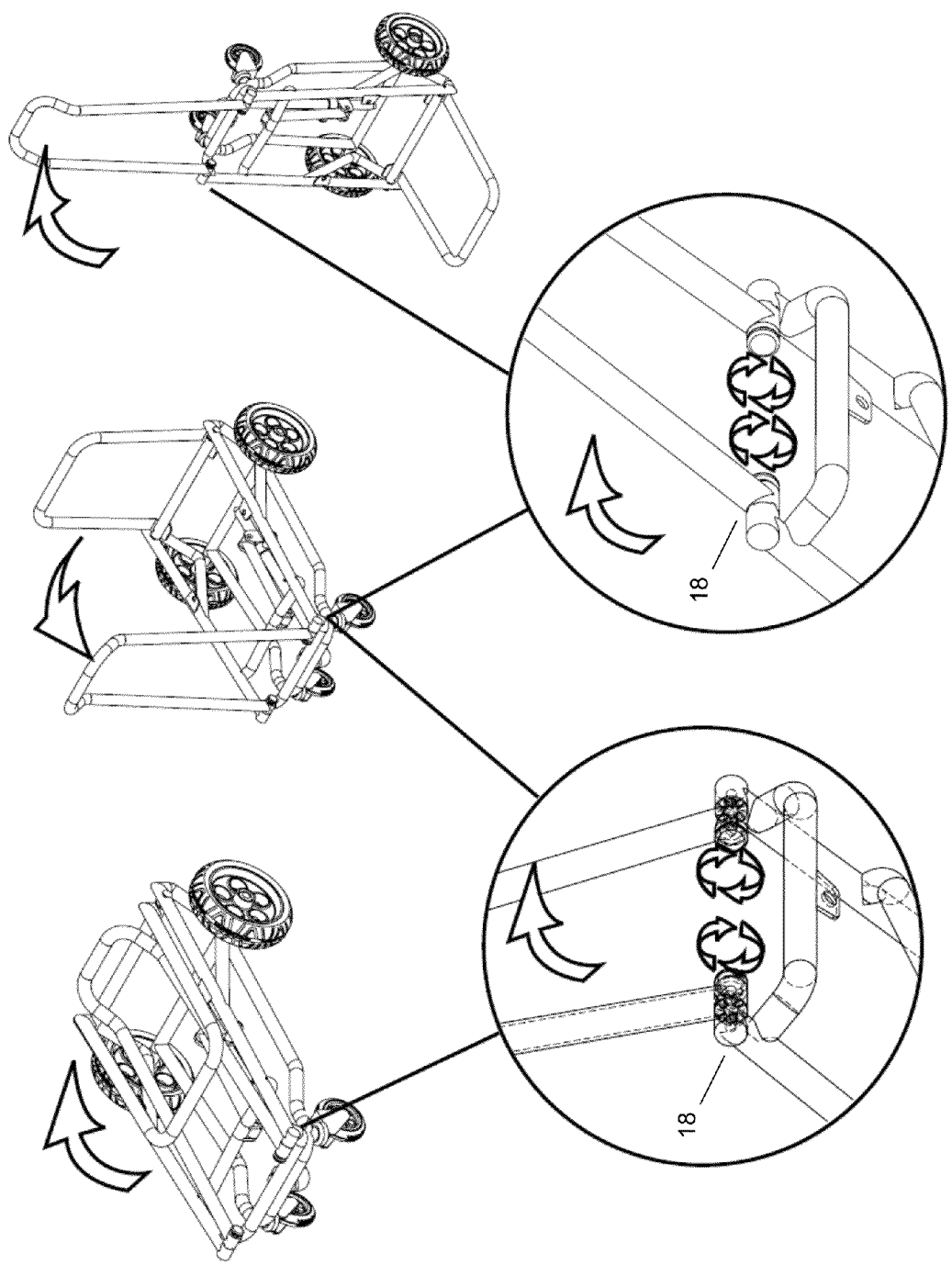
FIG. 6: a diagram illustrating the functionality of the joint mechanisms of the utility cart described herein.

As described herein, according to certain preferred embodiments of the present invention, the utility cart further comprises two or more elbow joints, which are configured to allow the different sections of the cart to rotate and lock into desired positions—i.e., the unique elbow joints allow the first, second, and third sections (10,12,14) of the utility cart to be positioned in the various operational angles described herein, such as in 90-degree increments. For example, referring now to FIG. 6, the invention provides that the second joint 18 is preferably configured to allow the third section 14 to (a) rotate and reversibly lock into a position that is parallel and contiguous with the second section 12 when the utility cart is converted to the dolly 6 and tilted positions 8, (b) rotate and reversibly lock into a position that is approximately perpendicular with the second section 12 when the utility cart is converted to the flat cart position 4, and (c) rotate and reversibly lock into a position that is adjacent to, or substantially adjacent to, the second section 12 when the utility cart is converted to the collapsed position 2. In addition, according to such embodiments, the invention provides that the first joint 16 is preferably configured to allow the first section 10 to (a) rotate and reversibly lock into a position that is approximately perpendicular with the second section 12 when the utility cart is converted to the flat cart position 4, dolly position 6, and the tilted position 8; and (b) rotate and reversibly lock into a position that rests on top of the third section 14, when the utility cart is converted to the collapsed position 2.

As mentioned above, the invention provides that the bottom portion 26 will preferably consist of a bar that spans at least a portion of the base portion 20 and is positioned in a center area between two sides 42 (FIG. 5) of the base portion 20. The base portion 20 may also be regarded as a fourth section of the utility cart described herein. The invention further provides that the second end 28 of the support arm mechanism 22 surrounds and is configured to slide along the bar that forms the bottom portion 26, as illustrated in FIG. 5. According to certain preferred embodiments, the second end 28 of the support arm mechanism 22 is prevented from sliding along the bottom portion 26 when in a locked position. In general, the invention provides that a locked position may be achieved by actuating a fastening mechanism which locks the second end 28 of the support arm mechanism 22 at a desired point along the axis of the bottom portion 26. Such fastening mechanism may consist of, for example, a rotatable knob (which may be rotated to tighten the second end 28 of the support arm mechanism 22 to the desired point along the axis of the bottom portion 26). Alternatively, the fastening mechanism may consist of a first aperture located in the second end 28 of the support arm mechanism 22, a corresponding second aperture located in the bottom portion 26, and a pin that may be reversibly disposed through the first aperture and second aperture (to lock the support arm mechanism 22 in place), i.e., a pop pin configuration. The invention provides that, in addition to the embodiments described above, other suitable mechanical means may be employed to serve as a fastening mechanism.

According to more preferred embodiments, as illustrated in FIG. 5, a stopper 44 may be slidably connected to the bottom portion 26, and the stopper 44 (when in a locked position) may be configured to prevent the support arm mechanism 22 from sliding along the bottom portion 26 in a first direction 48. More particularly, the stopper 44 may be fastened to the bottom portion 26 at a desired location (along the length and axis of the bottom portion 26). The invention provides that the stopper 44 may be fastened to the bottom portion 26 vis-à-vis a rotatable knob (which may be rotated to tighten and lock the stopper 44 into position). More preferably, however, as illustrated in FIG. 5, the stopper 44 may be fastened to the bottom portion 26 vis-à-vis a first aperture located in the stopper 44, a corresponding second aperture located in the bottom portion 26, and a pin 46 that may be reversibly disposed through the first aperture and second aperture. According to such embodiments, the pin 46 may be pulled out 50 of the first aperture and second aperture in order to unlock the stopper 44 from the bottom portion 26, such that the stopper 44 may be slidably moved to a different point 30 along the bottom portion 26.

The invention further provides that one or more magnets may be employed to cause the base portion 20 (i.e., the fourth section) of the utility cart, with the wheels affixed thereto, to be magnetically attached or secured to the second section 12, when the utility cart is configured in a collapsed 2 or dolly 6 position. The invention provides that such magnets allow the base portion 20 to remain in an upright position, which is parallel to the second section 12, when the utility cart is configured in a collapsed 2 or dolly 6 position. According to certain alternative embodiments, other mechanical means may be employed to cause the base portion 20 (i.e., the fourth section) of the utility cart, with the wheels affixed thereto, to be attached or secured to the second section 12, when the utility cart is configured in a collapsed 2 or dolly 6 position. Indeed, the invention encompasses other mechanical means for connecting these sections together, including mechanical fasteners, locks, belts, screws, latches, and other suitable means.

Referring to FIG. 2, the invention provides that a first pair of wheels 52 are connected to the base portion 20 and are located proximate to the first joint 16, and a second pair of wheels 54 are connected to the base portion 20 and are located proximate to the second joint 18 (when the utility cart is configured in a flat cart position 4). The first pair of wheels 52 preferably exhibit a larger diameter than the diameter of the second pair of wheels 54. The invention provides that configuring the first pair of wheels 52 to be larger than the second pair of wheels 54 is preferred to maximize the utility, and ease with which the utility cart may be pulled or pushed, when placed in the dolly position 6.

Figure 7:
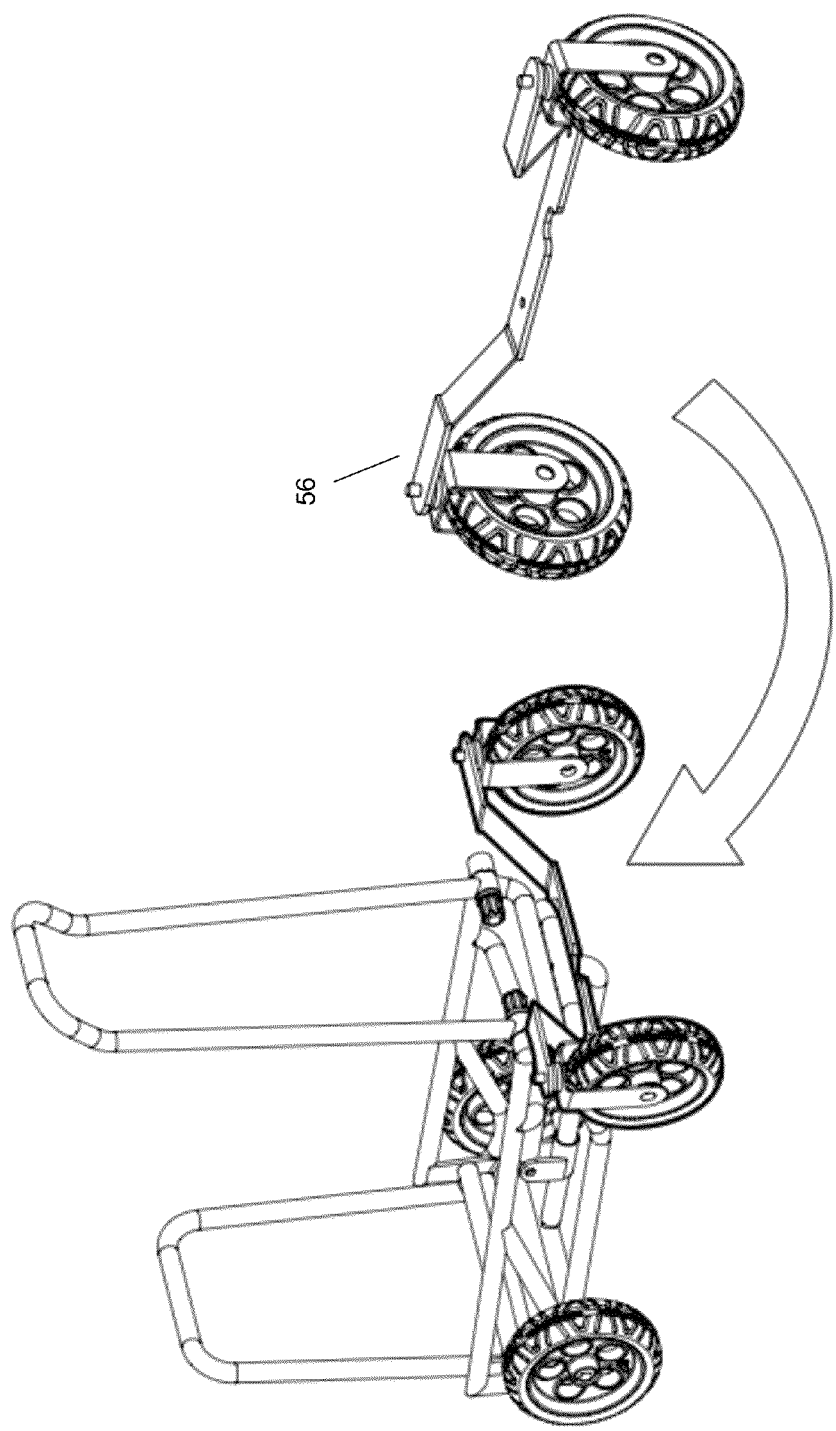
FIG. 7: a diagram illustrating the ability of the utility cart described herein, to be equipped with an upgraded set of wheels—which are approximately of the same diameter.

According to certain alternative embodiments, however, the invention provides that the first pair of wheels 52, and the second pair of wheels 54, may exhibit the same (or approximately the same) diameter. According to such embodiments, the diameter of the wheels may be approximately 3 to 12 inches or, more preferably, between 6 to 12 inches. In addition, referring to FIG. 7, the utility cart may comprise an interchangeable pair of wheels 56. For example, in such embodiments, the utility cart may, optionally, be equipped with a first pair of wheels 52 (FIG. 2) that is larger than a second pair of wheels 54 (FIG. 2). The invention provides that the second pair of wheels 54 may, as desired, be replaced with a set of wheels 56, which exhibit approximately the same dimensions as the first pair of wheels 52.

Figure 8:
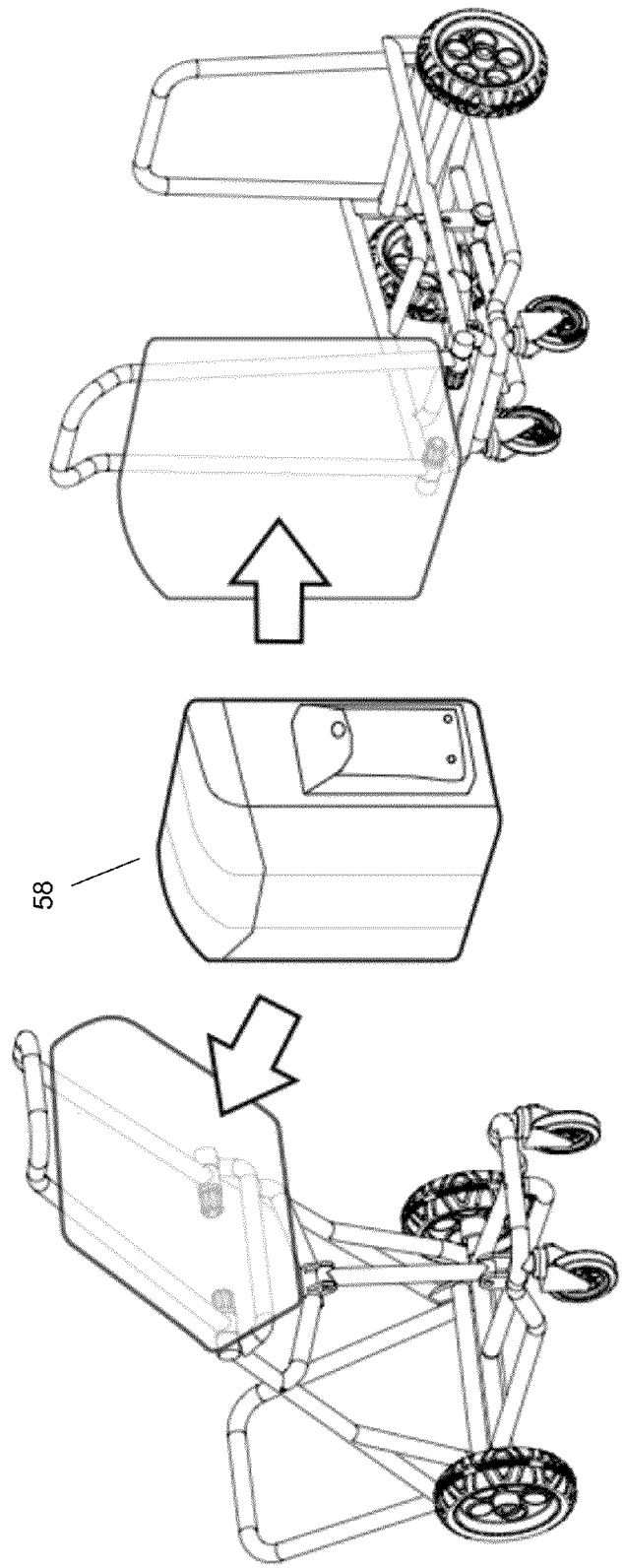
FIG. 8: a diagram illustrating the utility cart described herein, with an accessory bag attached thereto.
Figure 9:
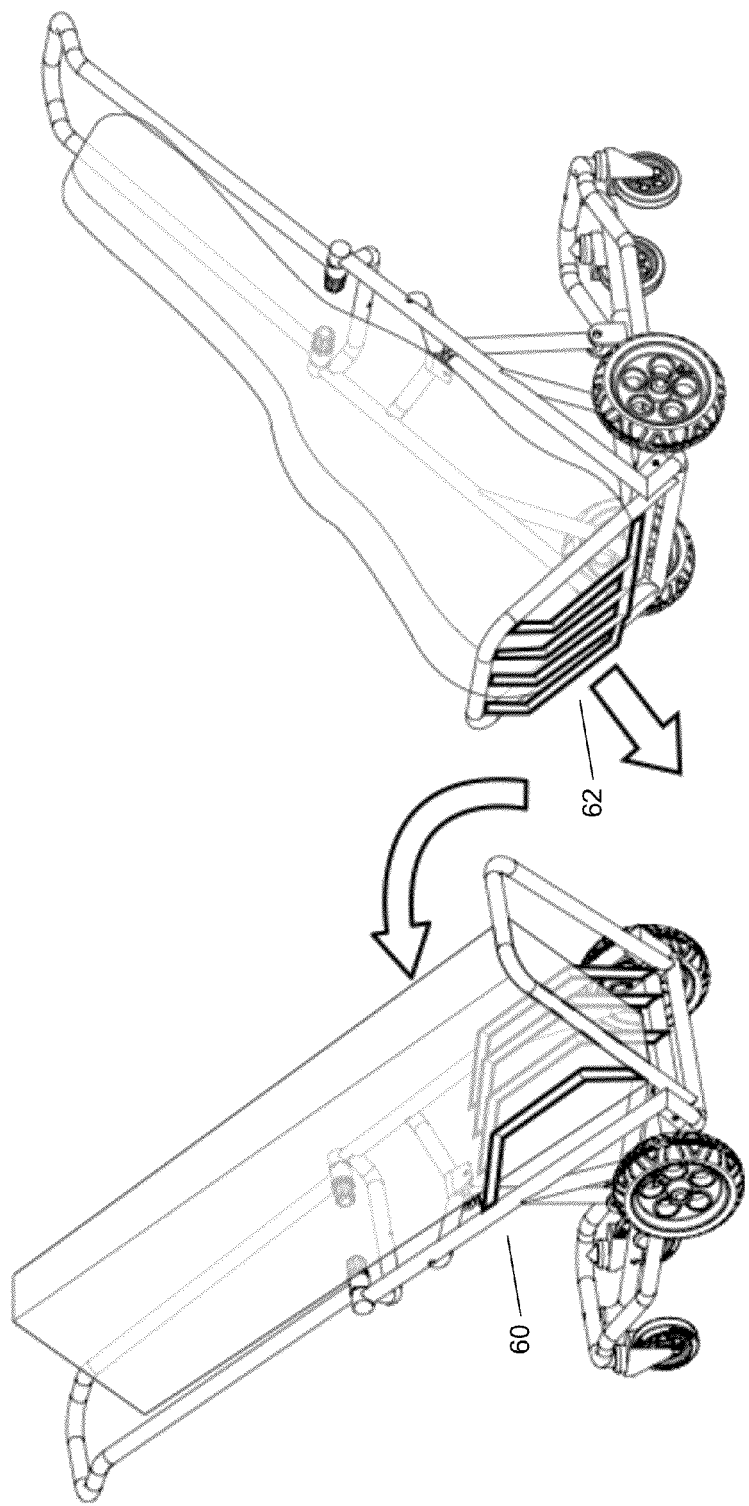
FIG. 9: a diagram illustrating the guitar case rack attachment described herein.

The invention further provides that the utility cart described herein may be equipped and used in connection with various accessories. Referring to FIG. 8, for example, the utility cart may be equipped with an accessory bag 58, which may be reversibly attached to the arm portion (third section 14) of the utility cart. In addition, referring to FIG. 9, the utility cart may optionally comprise a guitar case rack attachment. As shown in FIG. 9, the guitar case rack attachment 60 may be configured to secure a flat guitar case to the cart, or the guitar case rack attachment 62 may be configured to secure a rounded guitar case to the cart.

Figure 10:
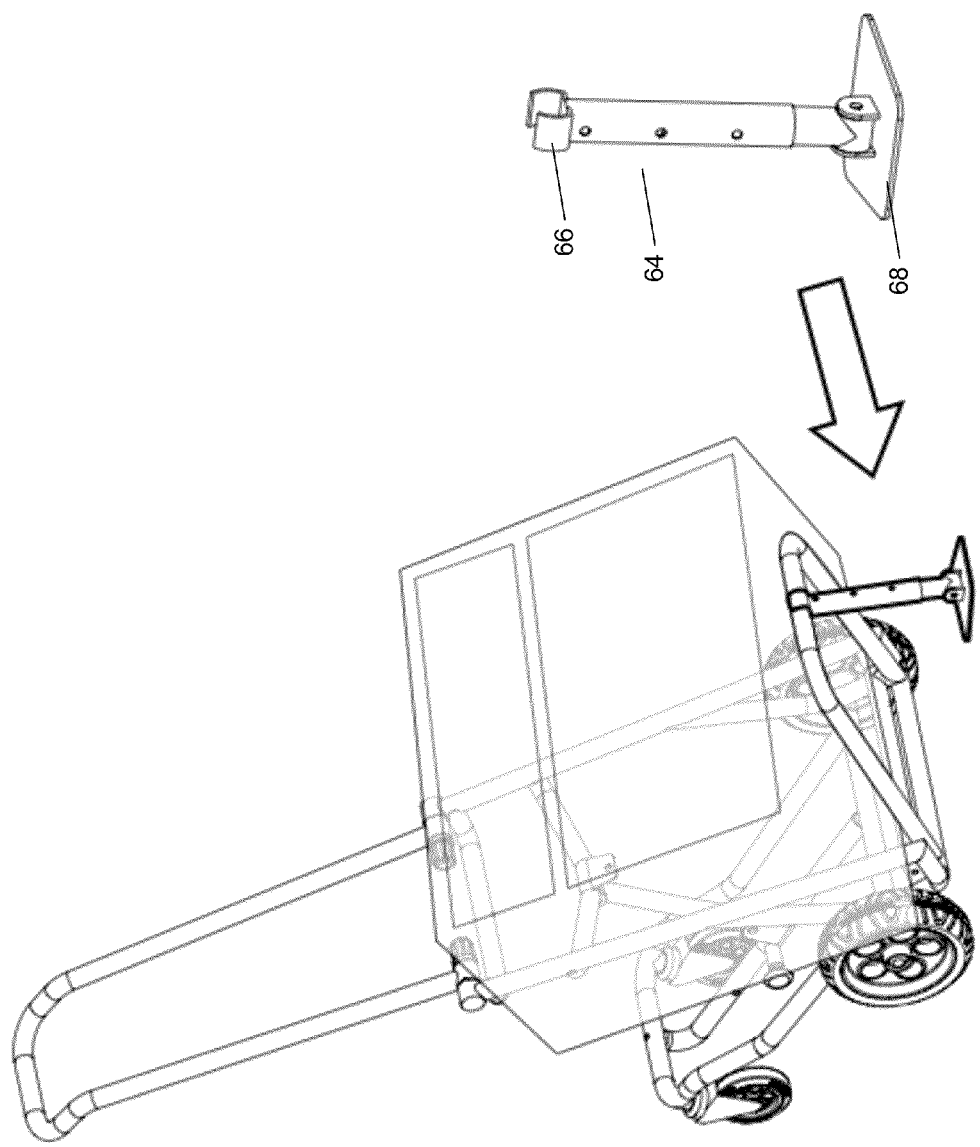
FIG. 10: a diagram illustrating the tilting brace described herein.

Referring now to FIG. 10, the invention further provides that the utility cart may comprise a tilting brace 64. The tilting brace 64 will be used to support the utility cart in the tilted position, particularly when the utility cart is supporting one or more pieces of cargo. The tilting brace 64 will comprise a first end 66 that is configured to receive, and be reversibly connected to, a portion of the first section 10. The tilting brace 64 will further include a second end 68 that comprises a flat/planar surface, which is adapted to rest against the ground. The flat/planar surface of the second end 68 is preferably configured to frictionally secure the tilting brace 64 to the ground, and to prevent the tilting brace 64 from sliding out from underneath the utility cart.

Figure 11:
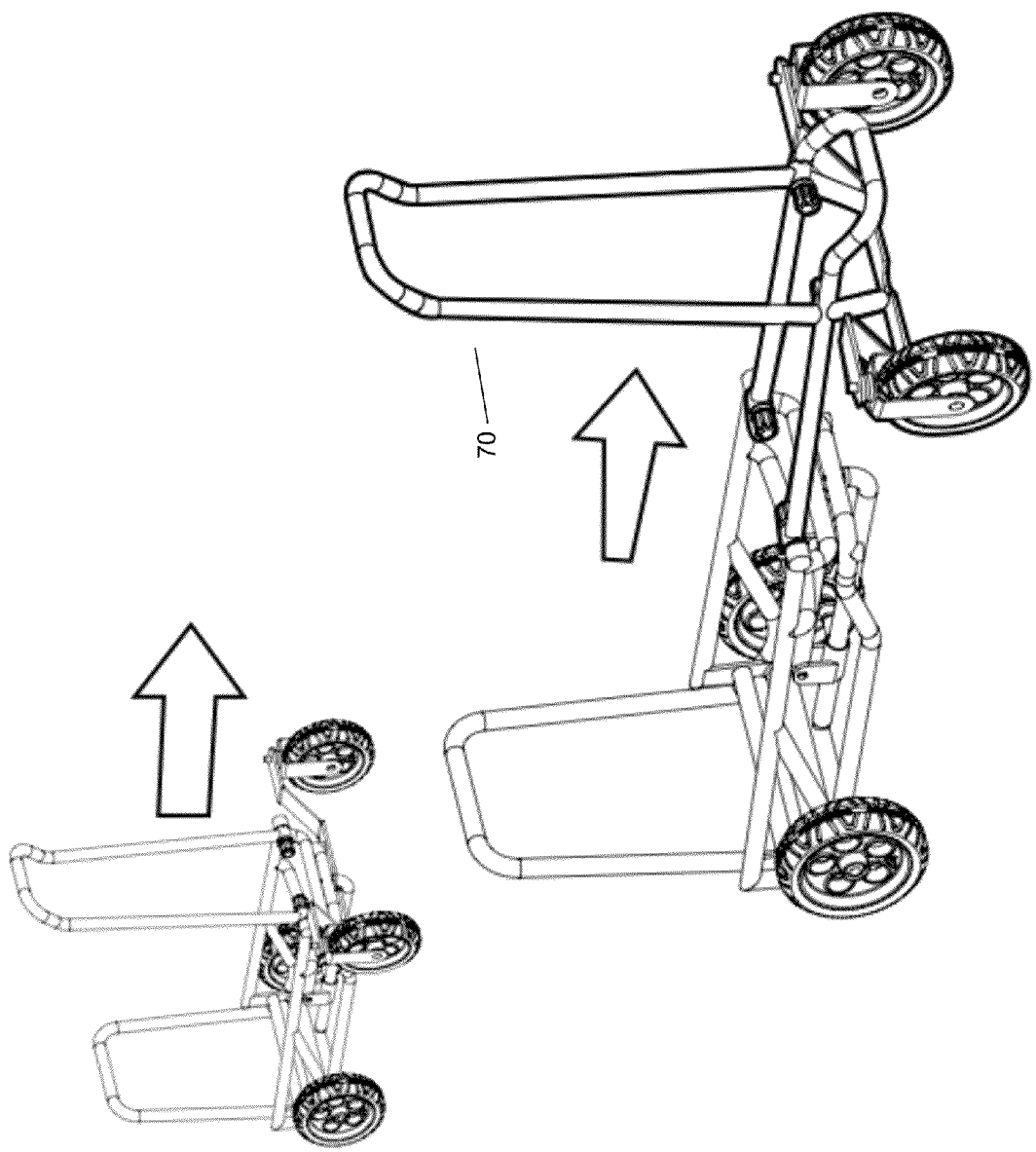
FIG. 11: a diagram illustrating the utility cart described herein, with an enlarged third section connected thereto.
Figure 12:
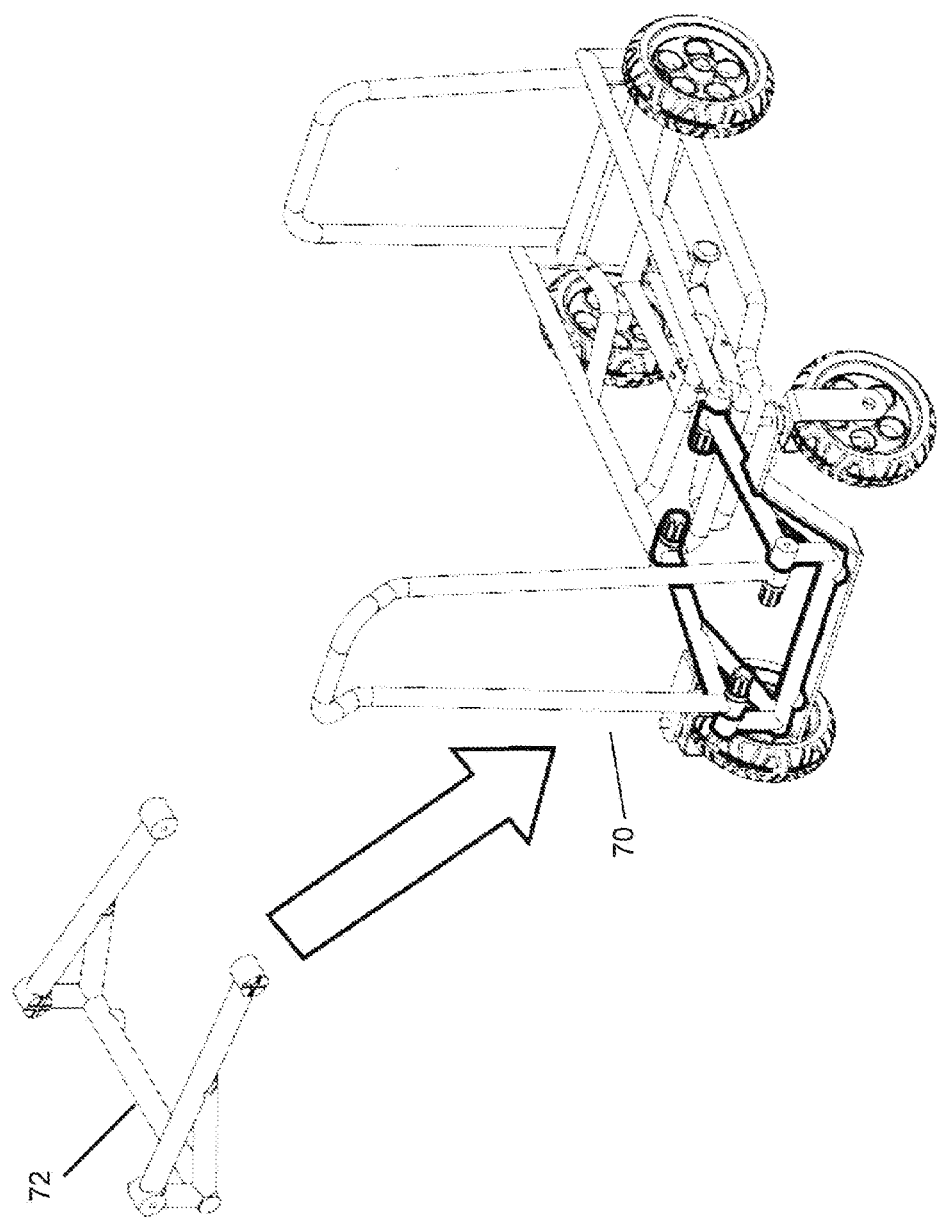
FIG. 12: a diagram that illustrates the XL connector described herein, which can be used to create the enlarged third section of the utility cart that is illustrated in FIG. 11.
Figure 13:
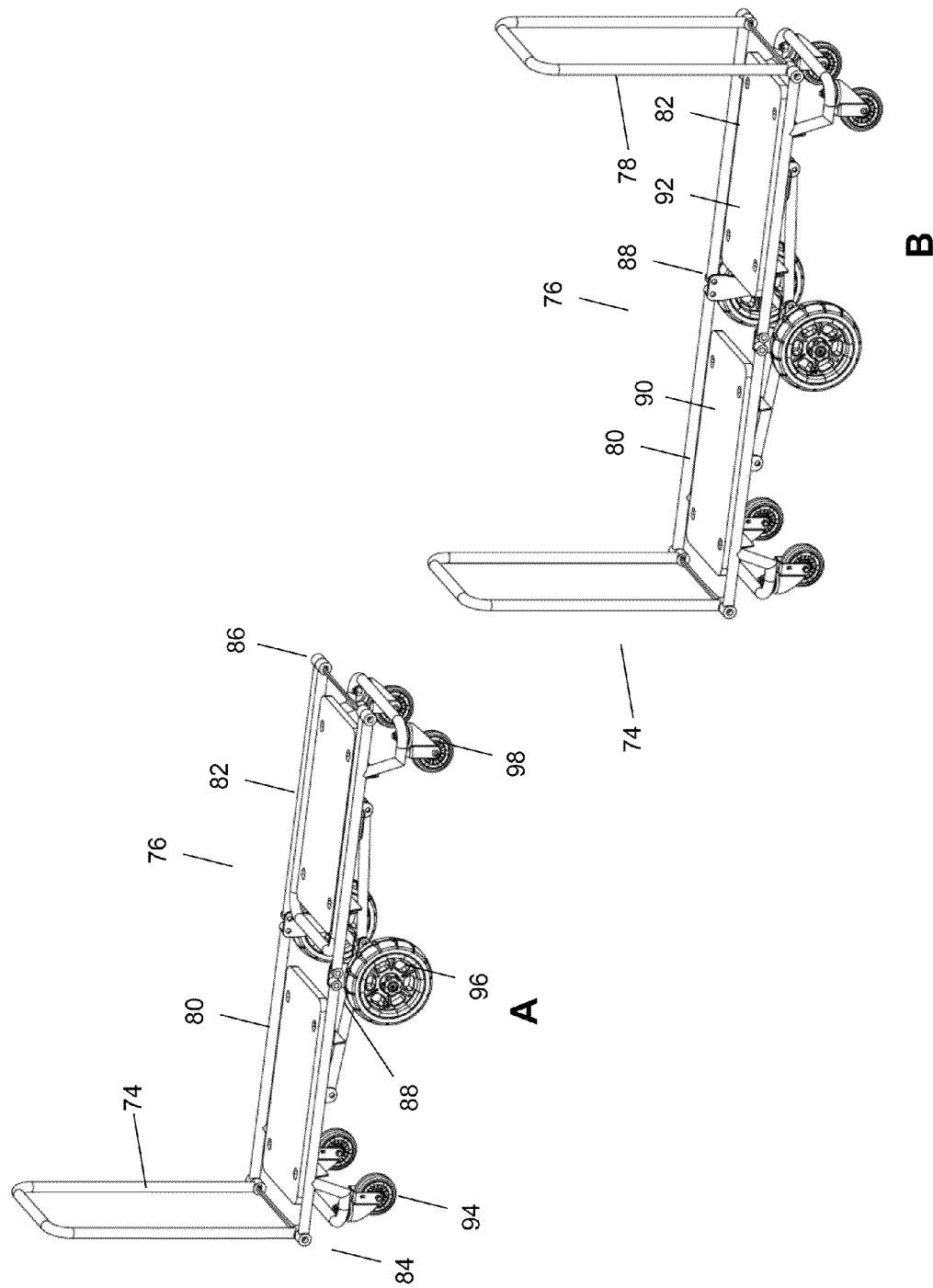
FIG. 13: (A) a side view of the six-wheel utility cart described herein in a position with the first section perpendicular to the second and third sections; and (B) a side view of the six-wheel utility cart described herein in a position with the first and third sections parallel to each other and perpendicular to the second section.

Referring now to FIG. 11, the utility cart may, optionally, be fitted with interchangeable handles 70. For example, according to certain embodiments, a first handle portion (third section 14) of the utility cart may be removed, and replaced with a second handle portion (third section 14)—whereby the second handle portion (third section 14) is larger or smaller than the first handle portion (third section 14) of the utility cart. Such embodiments allow handle portions of varying lengths and sizes to be reversibly attached to the utility cart, in order increase or decrease the overall size and dimensions of the utility cart as desired. According to still further embodiments, referring to FIG. 12, an XL connector 72 may be employed and reversibly secured to the existing handle portion (third section 14) of the utility cart, in order to lengthen the usable (load carrying) area of the cart—such as by about 18 inches. The invention provides that the XL connector 72 may be further connected to the existing pair of wheels (or wheel casters), and will comprise a joint portion, which will allow the handle portion (third section 14) and XL connector 72 combination to be folded into the collapsed position 2, as desired.

According to certain related embodiments, the present invention encompasses a six-wheel utility cart. More particularly, and referring now to FIGS. 13-16, the six-wheel utility car comprises three sections, namely, a first section 74, a second section 76, and a third section 78. The invention provides that the second section 76 comprises two segments, namely, a first segment 80 and a second segment 82. The invention provides that the first section 74 is connected to the first segment 80 of the second section 76 via a rotatable joint 84, and the third section 78 is connected to the second segment 82 of the second section 76 via another rotatable joint 86.

The invention provides that the first section 74 and a third section 78 may rotate about joint 84 and joint 86, respectively, and be locked into position, over a range of 180-degrees. More specifically, for example, the first section 74 may be rotated and locked into a position that is (i) parallel and contiguous with the first segment 80 of the second section 76; (ii) perpendicular with the first segment 80 of the second section 76; and (iii) collapsed into and nested within the first segment 80 of the second section 76. Likewise, the third section 78 may be rotated and locked into a position that is (i) parallel and contiguous with the second segment 82 of the second section 76; (ii) perpendicular with the second segment 82 of the second section 76; and (iii) collapsed into and nested within the second segment 82 of the second section 76. According to such embodiments, the first section 74 and a third section 78 will exhibit a smaller dimension than the first segment 80 and second segment 82, respectively, such that the first section 74 and third section 78 may be collapsed and nested within the first segment 80 and second segment 82, respectively, of the second section 76.

The invention further provides that the second section 76 comprises its own rotatable joint (or set of joints) 88, which is located in the center (or approximate center) of the second section 76, at the intersection of the first segment 80 and second segment 82. The invention provides that the rotatable joint (or set of joints) 88 allows the first segment 80 to rotate and lock into a desired position relative to the second segment 82 and, similarly, it allows the second segment 82 to rotate and lock into a desired position relative to the first segment 80. More particularly, the first segment 80 and second segment 82 may be rotated about joint 88 such that the segments are parallel and contiguous with each other (FIG. 13), perpendicular to each other (FIG. 14), and adjacent to each other (FIG. 16(B)). The invention provides that the second section 76 may comprise a platform 90,92 that may assist with holding cargo—and, more specifically, each of the first segment 80 and second segment 82 will comprise its own platform 90,92.

According to such embodiments, the utility cart will preferably comprise a first set of wheels 94 attached (directly or indirectly) to the first segment 80 and located near joint 84; a second set of wheels 96 attached (directly or indirectly) to the first segment 80 and/or second segment 82 (located near joint 88 and, preferably, in the middle of the second section 76); and a third set of wheels 98 attached (directly or indirectly) to the second segment 82 located near joint 86. According to certain preferred embodiments, the invention provides that the first and third set of wheels 94,98 will preferably comprise a caster-type of wheels, which may rotate about an axis by 360-degrees, whereas the second set of wheels 96 are fixed. Still further, the invention provides that the second set of wheels 96 are preferably larger in diameter than the first and third set of wheels 94,98.

Figure 14:
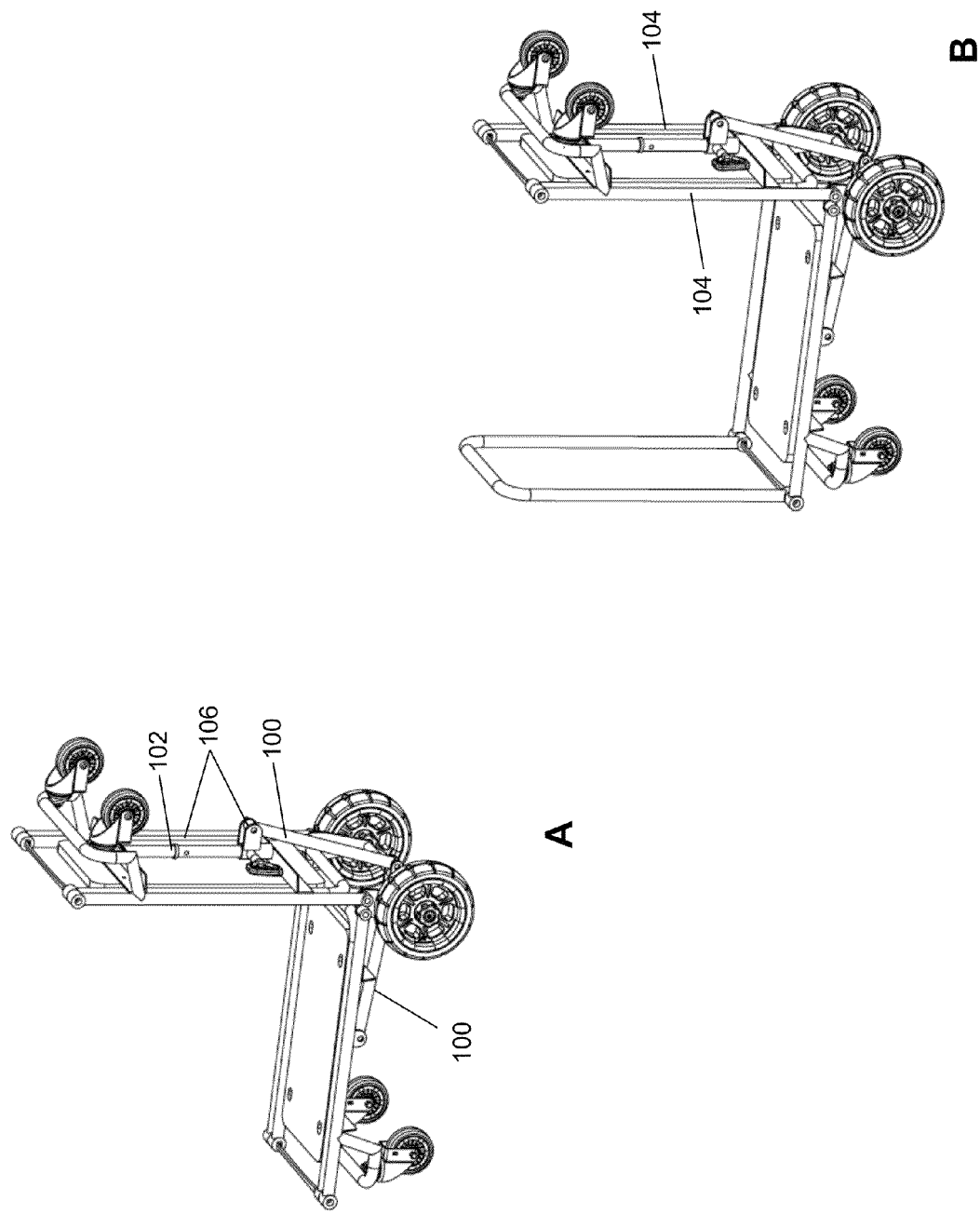
FIG. 14: (A) a side view of the six-wheel utility cart described herein in a position with a first segment of the second section perpendicular to a second segment of the second section, with the first section collapsed into the first segment and the third section collapsed into the second segment; and (B) a view of the cart shown in FIG. 14(A), with the first section positioned perpendicular to the first segment of the second section.
Figure 15:
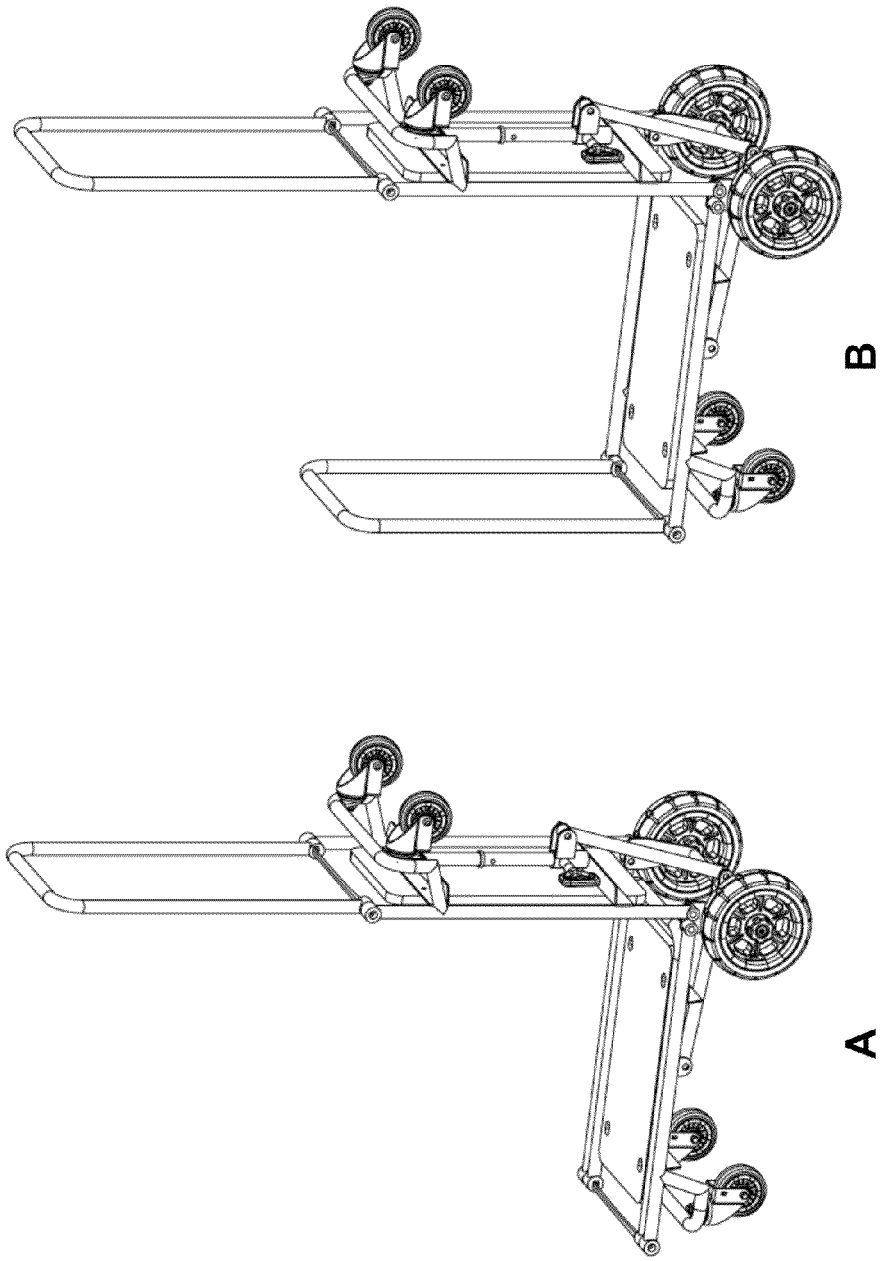
FIG. 15: (A) a side view of the six-wheel utility cart described herein in a position with a first segment of the second section perpendicular to a second segment of the second section, with the first section collapsed into the first segment and the third section positioned parallel and contiguous with the second segment; and (B) a view of the cart shown in FIG. 15(A), with the first section positioned perpendicular to the first segment of the second section.
Figure 16:
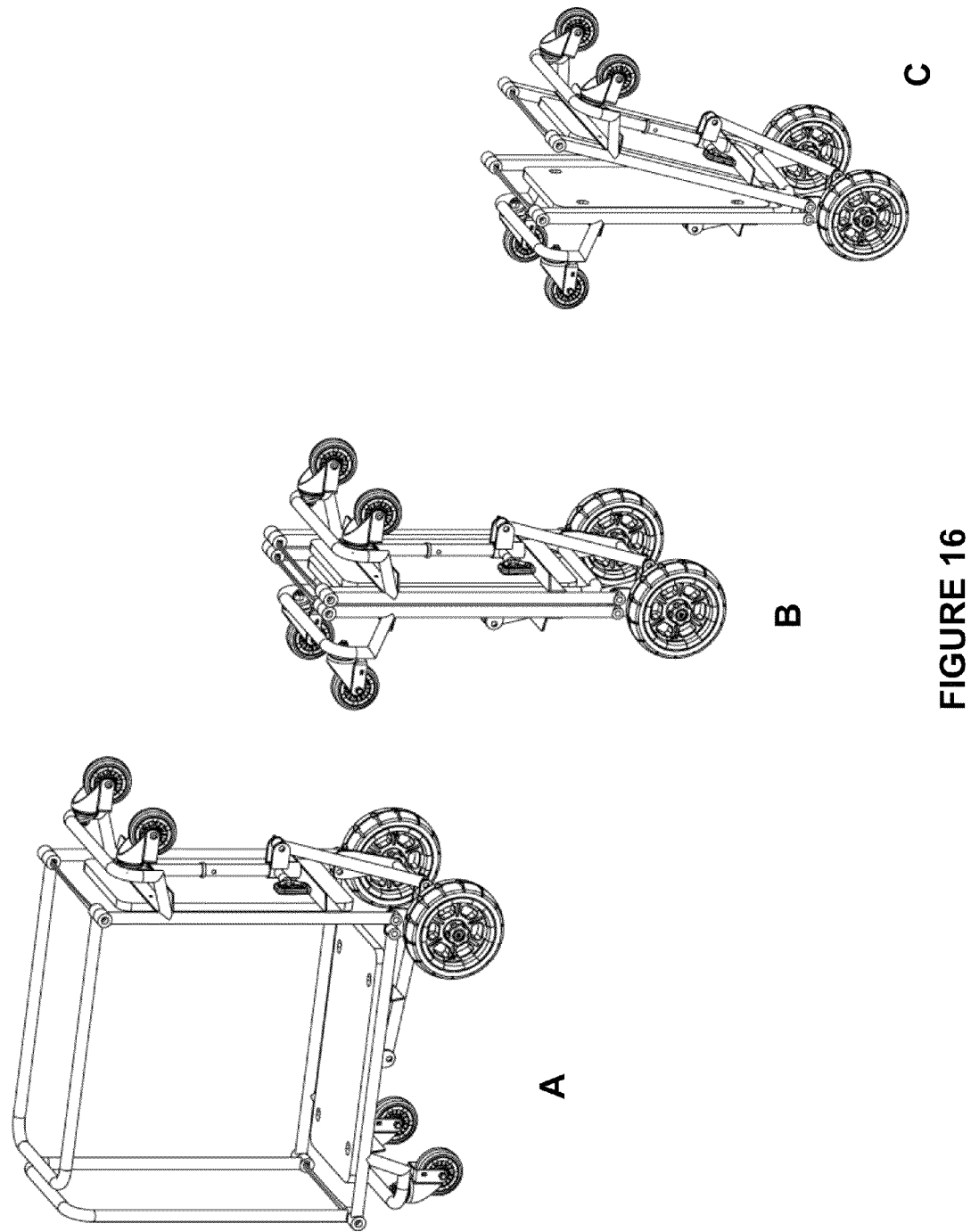
FIG. 16: (A) a side view of the six-wheel utility cart described herein in a position with a first segment of the second section perpendicular to a second segment of the second section, with the first section positioned perpendicular to the first segment and the third section positioned perpendicular with the second segment (such that the ends of the first and third sections meet); (B) a side view of the six-wheel utility cart described herein in a fully collapsed position; and (C) another side view of the six-wheel utility cart described herein in a partially collapsed position.

Referring to FIG. 14, similar to the utility carts described in the other embodiments above, the six-wheel utility cart may further comprise a support arm mechanism 100 that may be adjusted and used to secure the utility cart in various positions shown and described herein. More particularly, a first end of the support arm mechanism 100 is preferably affixed to an axis of the second set of wheels 96, and the other (second) end of the support arm mechanism 100 is affixed to a base portion 102. Similar to the embodiments described above, the base portion 102, which preferably consists of a bar that spans at least a portion of the second section 76 (e.g., one of the two segments) and is positioned in a center area between two sides 104 (FIG. 14) of the second section 76. The invention provides that the second end of the support arm mechanism 100 may be reversibly fastened to multiple points 106 along the base portion 102, using any of the mechanical fastening means described above. According to certain preferred embodiments, each of the first segment 80 and second segment 82 will preferably comprise its own support arm mechanism 100 (FIG. 14(A)).

The invention provides that the six-wheel utility cart embodiment may be configured into a variety of different and useful positions, much like the utility carts described in the other embodiments above. For example, and referring now to FIG. 13(A), the utility cart may be positioned with the first section 74 perpendicular to the second section 76 and third section 78 (with the third section 78 collapsed into and nested within the second segment 82 of the second section 76). Similarly, and referring to FIG. 13(B), the third section 78 may be positioned to be perpendicular to the second segment 82 of the second section 76 (with the first 74 and third sections 78 parallel to each other and perpendicular to the second section 76). The orientations shown in FIGS. 13(A) and 13(B) represent a type of "flat cart" position described above.

Referring now to FIG. 14(A), the six-wheel utility cart described herein may be positioned with a first segment 80 of the second section 76 perpendicular to the second segment 82 of the second section 76. In this configuration, the first section 74 is collapsed into the first segment 80 and the third section 78 is collapsed into the second segment 82. Similarly, and referring now to FIG. 14(B), the first section 74 may be positioned perpendicular to the first segment 80 of the second section 76, which creates a smaller version of the "flat cart" configuration mentioned above.

Referring now to FIG. 15(A), the six-wheel utility cart may further be positioned with the first segment 80 of the second section 76 perpendicular to the second segment 82 of the second section 76, with the first section 74 collapsed into and nested within the first segment 80 and the third section 78 positioned parallel and contiguous with the second segment 82. Similarly, referring to FIG. 15(B), the first section 74 may, alternatively, be positioned perpendicular to the first segment 80 of the second section 76. The orientations shown in FIGS. 15(A) and 15(B) represent a type of "dolly" position described above. Referring now to FIG. 16(A), the six-wheel utility cart may still further be positioned as shown in FIG. 15(B), with the third section 78 positioned perpendicular with the second segment 82, such that the ends of the first section 74 and third section 78 meet, to create an enclosed square-shaped cart.

FIG. 16(B) shows the six-wheel utility cart in a fully collapsed and compact position, with the first segment 80 and second segment 82 positioned adjacent to each other, the first section 74 nested within the first segment 80, and the third section 78 nested within the second segment 82. As described above, the invention provides that such fully collapsed and compact position is ideal for storing the utility cart during non-use. FIG. 16(C) shows a partially collapsed six-wheel utility cart, and shows how the first segment 80 and second segment 82 may be opened and caused to rotate away from each other about joint 88.

The invention provides that the utility carts of the present invention, and the various components thereof, may be constructed of any suitable and durable material. For example, the interconnected frame of the utility carts may be substantially comprised of steel, alloys, titanium, composite materials, elastomers, plastics, or combinations of the foregoing. In addition, the invention provides that the different parts of the interconnected frame, with the exception of the first and second joints (16,18), may be comprised of a single piece of material or, alternatively, may consist of multiple segments that are connected (e.g., welded or mechanically fastened) to each other. Of course, the wheels that are used in connection with the utility cart may be comprised of rubber (natural or synthetic), elastomers, plastics, or other suitable materials. Still further, the invention provides that the scale of the utility cart may be increased or decreased as necessary. That is, the invention encompasses utility carts of small, medium, and large sizes, whereby the sizes will generally be measured by the overall size of the different parts and sections that comprise the utility cart.

In addition to the utility carts described herein, the invention also encompasses methods of using the utility carts. More particularly, the invention encompasses methods of using the utility carts described herein to transport cargo from one location to another.

Although illustrative embodiments of the present invention have been described herein, it should be understood that the invention is not limited to those described, and that various other changes or modifications may be made by one skilled in the art without departing from the scope or spirit of the invention.

What is claimed is:

1. A utility cart that is capable of being converted into a collapsed position, a flat cart position, a dolly position, and a tilted position, which comprises:
   (a) an interconnected frame that comprises three sections, with a first section connected to a second section by a first joint and the second section connected to a third section by a second joint; and
   (b) a support arm mechanism that attaches to the second section at a first end of the support arm mechanism, and to a bottom portion of the utility cart at a second end of the support arm mechanism, wherein the second end of the support arm mechanism is reversibly securable to a plurality of points along the bottom portion of the utility cart, wherein:
      (i) securing the second end of the support arm mechanism along the plurality of points along the bottom portion causes a load bearing surface formed by the second section and third section to move forwards or backwards, when the utility cart is in a tilted position; and
      (ii) the second joint is configured to allow the third section to rotate and reversibly lock into a position that is parallel and contiguous with the second section when the utility cart is converted to the dolly and tilted positions, rotate and reversibly lock into a position that is approximately perpendicular with the second section when the utility cart is converted to the flat cart position, and rotate and reversibly lock into a position that rests adjacent to the second section when the utility cart is converted to the collapsed position.

2. The utility cart of claim 1, wherein the first joint is configured to allow the first section to (a) rotate and reversibly lock into a position that is approximately perpendicular with the second section when the utility cart is converted to the flat cart position, dolly position, or the tilted position; and (b) rotate and reversibly lock into a position that rests on top of the third section when the utility cart is converted to the collapsed position.

3. The utility cart of claim 2, wherein the bottom portion forms a part of a base portion of the utility cart, wherein the base portion comprises a set of wheels.

4. The utility cart of claim 3, wherein the bottom portion comprises a bar that spans at least a portion of the base portion and is positioned in a center area between two sides of the base portion.

5. The utility cart of claim 4, wherein the first end and the second end of the support arm mechanism each comprise a hinge.

6. The utility cart of claim 5, wherein the second end of the support arm mechanism surrounds and is configured to slide along the bar that forms the bottom portion.

7. The utility cart of claim 6, wherein the second end of the support arm mechanism is prevented from sliding along the bottom portion when in a locked position, wherein a locked position is achieved by actuating a fastening mechanism which locks the second end of the support arm at a desired point along the bottom portion.

8. The utility cart of claim 7, wherein the fastening mechanism comprises:
   (a) a rotatable knob; or
   (b) a first aperture located in the second end of the support arm mechanism, a corresponding second aperture located in the bottom portion, and a pin that may be reversibly disposed through the first aperture and second aperture.

9. The utility cart of claim 6, wherein the second end of the support arm mechanism is prevented from sliding along the bottom portion when in a locked position, wherein a locked position is achieved by fastening a stopper at a desired location along the bottom portion, wherein the stopper is configured to prevent the second end of the support arm mechanism from sliding past the stopper in a first direction.

10. The utility cart of claim 9, wherein the stopper is fastened to the bottom portion by:
(a) a rotatable knob; or
(b) a first aperture located in the stopper, a corresponding second aperture located in the bottom portion, and a pin that may be reversibly disposed through the first aperture and second aperture.

11. The utility cart of claim 10, wherein a first pair of wheels are connected to the base portion and proximate to the first joint, and a second pair of wheels are connected to the base portion and proximate to the second joint when the utility cart is configured in a flat cart position.

12. The utility cart of claim 11, wherein the first pair of wheels exhibit a larger diameter than a diameter of the second pair of wheels.

13. A utility cart that is capable of being converted into a collapsed position, a flat cart position, a dolly position, and a tilted position, which comprises:
(a) an interconnected frame that comprises three sections, with a first section connected to a second section by a first joint and the second section connected to a third section by a second joint; and
(b) a support arm mechanism that attaches to the second section at a first end of the support arm mechanism, and to a bottom portion of the utility cart at a second end of the support arm mechanism, wherein the second end of the support arm mechanism is reversibly securable to a plurality of points along the bottom portion of the utility cart, wherein:
(i) the first joint is configured to allow the first section to (a) rotate and reversibly lock into a position that is approximately perpendicular with the second section when the utility cart is converted to the flat cart position, dolly position, or the tilted position; and (b) rotate and reversibly lock into a position that rests on top of the third section when the utility cart is converted to the collapsed position; and
(ii) the second joint is configured to allow the third section to (a) rotate and reversibly lock into a position that is parallel and contiguous with the second section when the utility cart is converted to the dolly and tilted positions, (b) rotate and reversibly lock into a position that is approximately perpendicular with the second section when the utility cart is converted to the flat cart position, and (c) rotate and reversibly lock into a position that rests adjacent to the second section when the utility cart is converted to the collapsed position.

14. The utility cart of claim 13, wherein securing the second end of the support arm mechanism along the plurality of points along the bottom portion causes a load bearing surface formed by the second section and third section to move forwards or backwards, when the utility cart is in a tilted position.

15. The utility cart of claim 14, wherein the bottom portion forms a part of a base portion of the utility cart, wherein the base portion comprises a set of wheels.

16. The utility cart of claim 15, wherein the bottom portion comprises a bar that spans at least a portion of the base portion and is positioned in a center area between two sides of the base portion.

17. The utility cart of claim 16, wherein the first end and the second end of the support arm mechanism each comprise a hinge.

18. The utility cart of claim 17, wherein the second end of the support arm mechanism surrounds and is configured to slide along the bar that forms the bottom portion.

* * * * *